United States Patent
Zhu et al.

(10) Patent No.: US 7,937,680 B2
(45) Date of Patent: May 3, 2011

(54) METHOD AND APPARATUS FOR VERIFYING SPECIFICATION, AND COMPUTER PRODUCT

(75) Inventors: Qiang Zhu, Kawasaki (JP); Ryosuke Oishi, Kawasaki (JP); Tsuneo Nakata, Kawasaki (JP); Takashi Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/214,848

(22) Filed: Aug. 31, 2005

(65) Prior Publication Data

US 2006/0265676 A1    Nov. 23, 2006

(30) Foreign Application Priority Data

May 19, 2005    (JP) .................................. 2005-147247

(51) Int. Cl.
*G06F 17/50*    (2006.01)
*G06F 21/00*    (2006.01)
*G06Q 20/00*    (2006.01)

(52) U.S. Cl. ............................ 716/106; 705/72; 713/182
(58) Field of Classification Search ................. 716/1–18; 703/6–22; 705/72; 713/182
See application file for complete search history.

(56) References Cited

U.S. PATENT DOCUMENTS

| | | | | |
|---|---|---|---|---|
| 5,774,370 A | * | 6/1998 | Giomi | 716/4 |
| 6,038,378 A | * | 3/2000 | Kita et al. | 714/38 |
| 6,633,838 B1 | * | 10/2003 | Arimilli et al. | 703/16 |
| 6,751,582 B1 | * | 6/2004 | Andersen et al. | 703/14 |
| 7,006,960 B2 | * | 2/2006 | Schaumont et al. | 703/15 |
| 7,117,462 B2 | * | 10/2006 | Kimura et al. | 716/5 |
| 2003/0229597 A1 | * | 12/2003 | de Jong | 705/72 |
| 2003/0229791 A1 | * | 12/2003 | De Jong | 713/182 |

FOREIGN PATENT DOCUMENTS

| | | |
|---|---|---|
| JP | 6-75761 | 3/1994 |
| JP | 8-6778 | 1/1996 |
| JP | 8-16625 | 1/1996 |
| JP | 2001-202398 | 7/2001 |
| JP | 2004-78501 | 3/2004 |

OTHER PUBLICATIONS

Zhu, et al., "System-On-Chip Validation using UML and CWL", Codes ISSS'04, Sep. 8-10, 2004, 92-97.*
Oishi, et al., "Methodology for high-level verification with UML", DA Symposium 2004, Information Processing Society of Japan, Jul. 21, 2004, vol. 2004, No. 8, pp. 79-84.
Japanese Office Action mailed on Apr. 14, 2009 in corresponding Japanese Patent Application 2005-147247 (3 pages) (2 pages English translation).

* cited by examiner

*Primary Examiner* — Jack Chiang
*Assistant Examiner* — Patrick Sandoval
(74) *Attorney, Agent, or Firm* — Staas & Halsey LLP

(57) ABSTRACT

An apparatus for verifying a specification includes a use-case extracting unit, a first setting unit, an operation extracting unit, a second setting unit, and a determining unit. The use-case extracting unit extracts an unprocessed use case from specification data. The first setting unit sets a condition based on a precondition, a postcondition, and an invariant condition for the use case. The operation extracting unit selects an event flow of an unprocessed path from the specification data and extracts an unprocessed operation (description) from the event flow selected. The second setting unit sets a precondition and a postcondition for the operation based on the extracted operation (description). The determining unit determines whether the invariant condition is valid.

9 Claims, 11 Drawing Sheets

METHOD AND APPARATUS FOR VERIFYING SPECIFICATION, AND COMPUTER PRODUCT

CROSS-REFERENCE TO RELATED APPLICATIONS

This application is based upon and claims the benefit of priority from the prior Japanese Patent Application No. 2005-147247, filed on May 19, 2005, the entire contents of which are incorporated herein by reference.

BACKGROUND OF THE INVENTION

1. Field of the Invention

The present invention relates to a method and an apparatus for verifying a specification of a subject of design such as hardware and software.

2. Description of the Related Art

Due to an increased scale and multi-functionality of software and hardware, verification work for confirming that a system operates properly has been becoming more and more complicated. 50% of work in software development and 70% to 80% of work in hardware development are such verification work. Especially, work repeated for correction due to faults in specifications is very common, and 75% of work for redesigning in large-scale integration (LSI) design is due to faults in specifications.

The verification work mentioned above requires two kinds of verification work. One is to confirm that the system is designed correctly, and the other is to confirm that the system is implemented correctly. A conventional technology for the verification work basically focuses on confirmation of correct implementation. As for confirmation of correct design, verification is performed on the specifications by visual inspection since the specifications are usually written in a natural language. Methods of verification of specifications are disclosed in, for example, Japanese Patent Laid-Open Publication Nos. 2001-202398, 2004-78501, H8-6778, H6-75761, and H8-16625.

However, if the specifications are verified by the visual inspection, it is impossible to eliminate such problems as ambiguities, inconsistencies, omissions, and errors. Consequently, some of the problems may be reflected in implementation to lead to a faulty design. Thus, design quality is deteriorated. Removal of the faulty design at a stage of implementation requires considerable time and effort, resulting in prolonging a design period and increasing a workload on a designer.

In the apparatus for supporting verification of a specification disclosed in Japanese Patent Laid-Open Publication No. 2001-202398, a use case is not used. Consequently, the specifications are not verified in terms of function. As a result, if an error is included in a function, the error cannot be removed. Thus, the design quality can be deteriorated.

In an apparatus for supporting design and a method of evaluating a design result disclosed in Japanese Patent Laid-Open Publication No. 2004-78501, only whether requirement is satisfied is checked, and such problems as ambiguities, inconsistencies, omissions, and errors cannot be eliminated from the specifications. Thus the design quality can be deteriorated.

In the apparatus for verifying a specification of software disclosed in Japanese Patent Application Laid-Open Publication No. H8-6778, although omissions in a state of the specifications are checked, omissions or inconsistencies in an event flow from an external device are not checked. Therefore, it is impossible to completely eliminate such problems as ambiguities, inconsistencies, omissions, and errors. Thus, the design quality can be deteriorated.

In apparatus for verifying a specification disclosed in Japanese Patent Application Laid-Open Publication No. H6-75761, the specifications should be written in an algebraic language. However, specifically how the specifications are written is unclear, and it is difficult to actually write entire specifications in the algebraic language. Consequently, a workload on a designer increases.

In an apparatus for verifying execution of a specification disclosed in Japanese Patent Application Laid-Open No. H8-16625, the specification should be converted into a model. This increases a number of processes, resulting in an increased design period and an increased workload on a designer.

Thus, in the conventional technologies described above, it is impossible to completely eliminate the problems, such as ambiguities, inconsistencies, omissions, and errors, from the specifications. As a result, the design quality is deteriorated, and the verification period and the workload on the designer increase.

SUMMARY OF THE INVENTION

It is an object of the present invention to solve at least the above problems in the conventional technology.

A method of verifying a specification according to one aspect of the present invention includes extracting a use case from specification data that includes a use case diagram illustrating a function of a subject of design; setting a first condition for validity of the specification data based on the use case extracted; extracting an operation from an event flow of a path representing an action of the subject of design; setting a second condition for the operation; determining whether the first condition is valid based on the second condition; and outputting a result of determination produced by the determining.

A computer-readable recording medium according to another aspect of the present invention stores a computer program for realizing a method of verifying a specification according to the above aspect.

An apparatus for verifying a specification according to still another aspect of the present invention includes a first extracting unit that extracts a use case from specification data that includes a use case diagram illustrating a function of a subject of design; a first setting unit that sets a first condition for validity of the specification data based on the use case extracted; a second extracting unit that extracts an operation from an event flow of a path representing an action of the subject of design; a second selling unit that sets a second condition for the operation; a determining unit that determines whether the first condition is valid based on the second condition; and an outputting unit that outputs a result of determination by the determining unit.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be explained in detail below with reference to the accompanying drawings.

Figure 1:
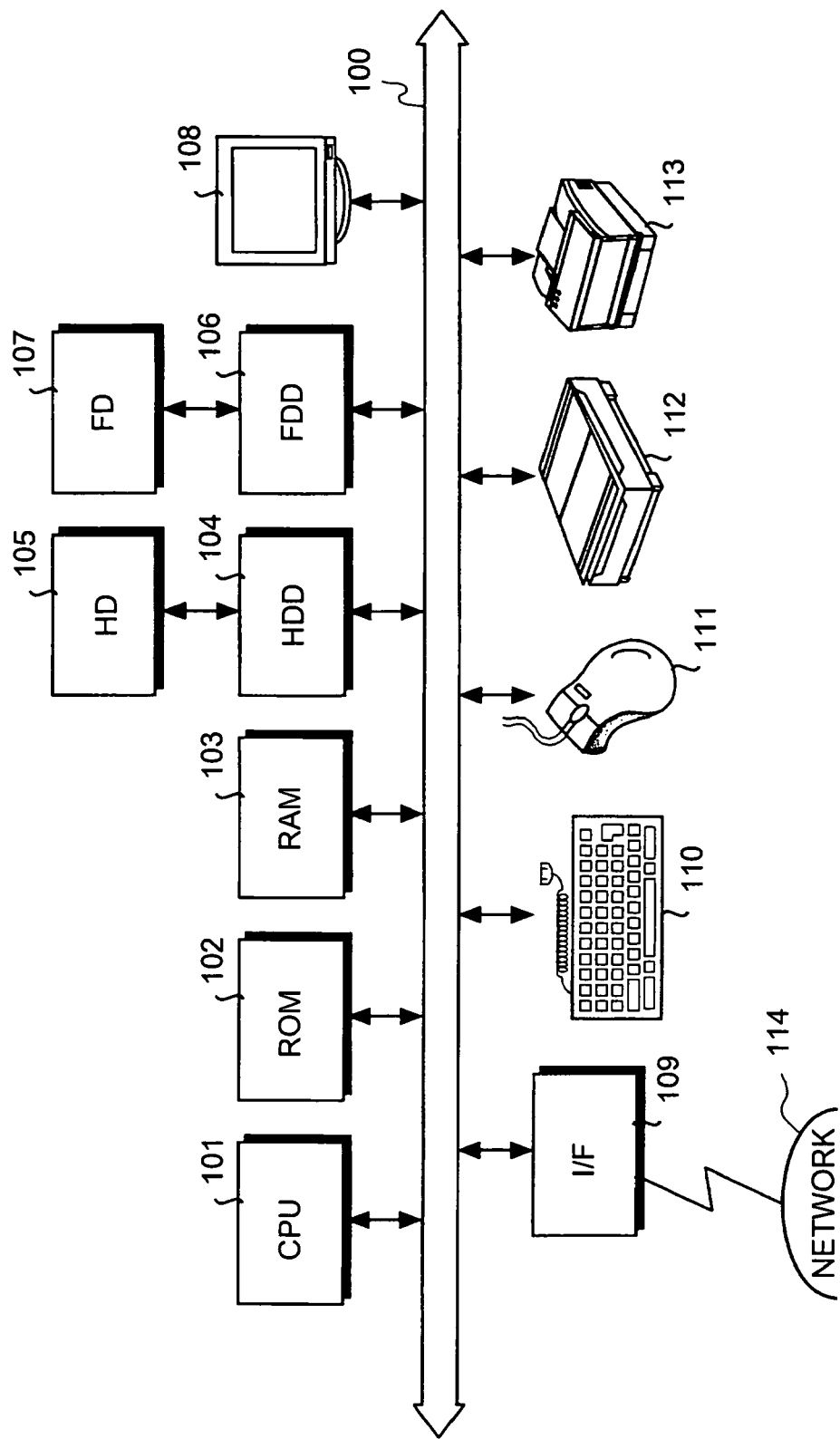
FIG. 1 is a schematic of a hardware configuration of an apparatus for verifying a specification according to embodiments of the present invention.

FIG. 1 is a schematic of a hardware configuration of an apparatus for verifying a specification according to embodiments of the present invention. As shown in FIG. 1, the apparatus includes a central processing unit (CPU) 101, a read-only memory (ROM) 102, a random access memory (RAM) 103, a hard disk drive (HDD) 104, a hard disk (HD) 105, a flexible disk drive (FDD) 106, a flexible disk (FD) 107 as an example of a removable recording medium, a display 108, an interface (I/F) 109, a keyboard 110, a mouse 111, a scanner 112, and a printer 113. Each of components is connected through a bus 100.

The CPU 101 controls a whole of the apparatus. The ROM 102 stores a computer program such as a boot program. The RAM 103 is used as a work area of the CPU 101. The HDD 104 controls read/write of data from/to the HD 105 in accordance with the control of the CPU 101. The HD 105 stores data that is written in accordance with the control of the HDD 104.

The FDD 106 controls read/write of data from/to the FD 107 in accordance with the control of the CPU 101. The FD 107 stores data that is written by a control of the FDD 106 and lets the apparatus read the data stored in the FD 107.

Apart from the FD 107, a compact-disc read-only memory (CD-ROM), a compact-disc readable (CD-R), a compact-disc rewritable (CD-RW), a magneto optical disc (MO), a digital versatile disc (DVD), and a memory card may also be used as the removable recording medium. The display 108 displays a curser, an icon, a tool box as well as data such as documents, images, and functional information. A cathode ray tube (CRT), a thin film transistor (TFT) liquid crystal display, or a plasma display can be used as the display 108.

The I/F 109 is connected to a network 114 such as the Internet through a communication line and is connected to other devices through the network 114. The I/F 109 controls the network 114 and an internal interface to control input/output of data to/from external devices. A modem or a local area network (LAN) adapter can be used as the I/F 109.

The keyboard 110 includes keys for inputting characters, numbers, and various instructions, and is used to input data. A touch panel input pad or a numerical key pad may also be used as the keyboard 110. The mouse 111 is used to shift the curser, select a range, shift windows, and change sizes of the windows on a display. A track ball or a joy stick may be used as a pointing device if functions similar to those of the mouse 111 are provided.

The scanner 112 optically captures an image and inputs image data to the apparatus. The scanner 112 may be provided with an optical character read (OCR) function. The printer 113 prints the image data and document data. For example, a laser printer or an inkjet printer may be used as the printer 113.

Figure 2:
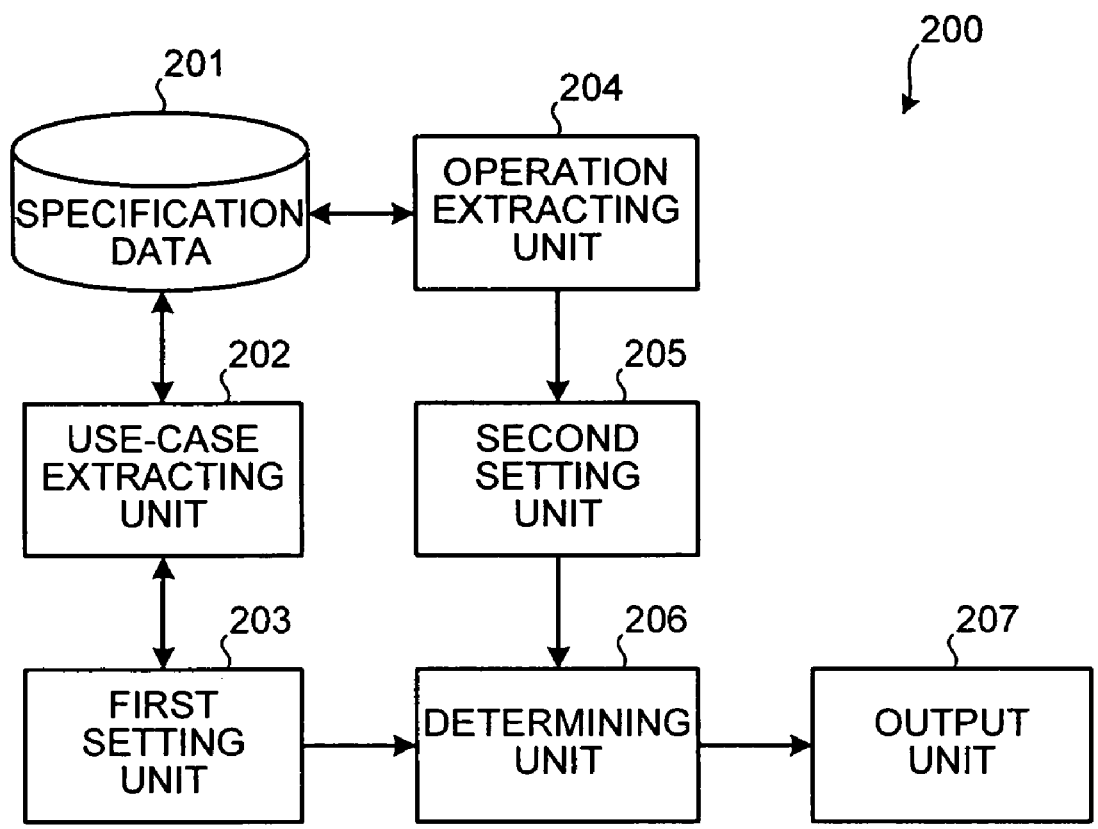
FIG. 2 is a block diagram of a functional configuration of the apparatus shown in FIG. 1.

FIG. 2 is a block diagram of a functional configuration of the apparatus shown in FIG. 1. As shown in FIG. 2, an apparatus for verifying a specification 200 includes specification data 201, a use-case extracting unit 202, a first setting unit 203, an operation extracting unit 204, a second setting unit 205, a determining unit 206, and an output unit 207.

The specification data 201 is computer-readable digital data that indicates a specification of a subject of design such as software or hardware. Specifically, the specification data 201 includes a use case diagram illustrating a function of the subject, conditions defined in each use case in the use case diagram, an event flow (sequence diagram) of a path indicating an action of the subject, and operations (operation description) included in the event flow.

The conditions defined in the use case include a precondition, a postcondition, and an invariant condition. The precondition is a condition that is required to be satisfied before execution of the use case. The postcondition is a condition that is required to be satisfied after execution the use case. The invariant condition is a condition that is invariant and that is required to be satisfied until the postcondition is satisfied.

The paths indicating the action includes a basic path, an alternative path, and an exceptional path. The basic path indicates a basic action of the use case. The alternative path indicates an alternative action that is alternative to the basic action of the use case. The exceptional path indicates an action other than the basic action and the alternative action.

A precondition and a postcondition are defined for the operation description. The precondition defined is a condition that is required to be satisfied before execution of the operation. The postcondition is a condition that is required to be satisfied after the execution of the operation.

The use-case extracting unit 202 extracts a use case from the use cases diagram in the specification data 201. Extraction of a use case continues until all use cases are extracted.

The first setting unit 203 sets conditions for validity of the specification data 201 based on the use case extracted. Specifically, the first setting unit 203 extracts the precondition, from the specification data 201, the postcondition, and the invariant condition defined for the use case extracted, and sets condition A below.

precondition UPRE->invariant condition UINV until postcondition UPOS       A.

Condition A defines that once a precondition UPRE is satisfied, the use case is executed under an invariant condition UINV until a postcondition UPOS is satisfied.

In condition A, the precondition UPRE is set based on the precondition defined for the use case. If only one precondition is defined for the use case, the precondition is set as the precondition UPRE. If more than one precondition is defined for the use case, the precondition UPRE is set by combining all the preconditions with "AND". In other words, the precondition UPRE is a condition that satisfies all the preconditions defined for the use case.

Similarly, the postcondition UPOS is set based on the postcondition defined for the use case. If only one postcondition is defined for the use case, the postcondition is set as the postcondition UPOS. If more than one postcondition is defined for the use case, the postcondition UPOS is set by combining all the postconditions with "AND". In other words, the postcondition UPOS is a condition that satisfies all the postconditions defined for the use case.

In a similar manner, the invariant condition UINV is set based on the invariant condition defined for the use case. If only one invariant condition is defined for the use case, the invariant condition is set as the invariant condition UINV. If more than one invariant condition is defined for the use case, the invariant condition UINV is set by combining all the invariant conditions with "AND". In other words, the invariant condition UINV is a condition that satisfies all the invariant conditions defined for the use case.

Furthermore, the first setting unit 203 sets the path, the precondition that is required before execution of the path for the use case, and the postcondition that is required after the execution of the path for the use case. Specifically, when a use case is extracted, the first setting unit 203 extracts the precondition, the postcondition, and the event flow of the path for the use case from the specification data 201 to set conditions B to D below.

precondition UPRE->basic path->postcondition UPOS  B.

precondition UPRE->alterative path->postcondition UPOS  C.

precondition UPRE->exceptional path->exceptional postcondition UPOS  D.

Condition B defines that when the precondition UPRE is satisfied, if the basic path is executed, the postcondition UPOS is satisfied. Condition C defines that when the precondition UPRE is satisfied, if the alternative path is executed, the postcondition UPOS is satisfied. Condition C defines that when the precondition UPRE is satisfied, if the exceptional path is executed, an exceptional postcondition UPOS is satisfied.

In conditions B to D, the precondition UPRE is set based on the precondition defined for the use case. If only one precondition is defined for the use case, the precondition is set as the precondition UPRE. If more than one precondition is defined for the use case, the precondition UPRE is set by combining all the preconditions with "AND". In other words, the precondition UPRE is a condition that satisfies all the preconditions defined for the use case.

Similarly, the postcondition including the exceptional postcondition UPOS is set based on the postcondition defined for the use case. If only one postcondition is defined for the use case, the postcondition is set as the postcondition UPOS. If more than one postcondition is defined for the use case, the postcondition UPOS is set by combining all the postconditions with "AND". In other words, the postcondition UPOS is a condition that satisfies all the postconditions defined for the use case.

The operation extracting unit 204 extracts an operation from the event flow of the path. Specifically, the operation extracting unit 204 extracts an operation description from the event flow of the path in the specification data 201. The extraction of an operation description continues until all the operation descriptions in the specification data 201 are extracted.

The second setting unit 205 sets a precondition OiPRE and a postcondition OiPOS for the operation extracted. The letter "i" (i=1 to n) in OiPRE and OiPOS represents a number of an operation description. In conditions A to D, the precondition OiPRE is set based on the precondition defined for the operation description. If only one precondition is defined for the operation description, the precondition is set as the precondition OiPRE. If more than one precondition is defined for the operation description, the precondition OiPRE is set by combining all the preconditions with "AND". In other words, the precondition OiPRE is a condition that satisfies all the preconditions defined for the operation description.

Similarly, the postcondition OiPOS is set based on the postcondition defined for the operation description. If only one postcondition is defined for the operation description, the postcondition is set as the postcondition OiPOS. If more than one postcondition is defined for the operation description, the postcondition OiPOS is set by combining all the postconditions with "AND". In other words, the postcondition OiPOS is a condition that satisfies all the postconditions defined for the operation description.

The determining unit 206 determines, based the conditions for the operation set by the second setting unit 205, whether the conditions set by the first setting unit 203 are valid. By determining the validity of the conditions set by the first setting unit 203, it is possible to check whether the specification is correct. Specifically, for condition A, the determining unit 206 determines whether the invariant condition UINV is valid when the precondition UPRE and the postcondition UPOS set by the first setting unit 203 are replaced with the precondition OiPRE and the postcondition OiPOS set by the second setting unit 205.

Furthermore, the determining unit 206 determines whether the precondition UPRE includes the precondition OiPRE, and whether the postcondition UPOS includes the postcondition OiPOS.

The output unit 207 outputs a result of determination by the determining unit 206. Specifically, the output unit 207 outputs a result "OK" or "NG" as the result of determination by displaying the result on the display 108, by printing out from the printer 113, or by outputting from a speaker.

The specification data 201 is, for example, recorded on a recording medium such as the ROM 102, the RAM 103, and the HD 105 shown in FIG. 1. Functions of the use-case extracting unit 202, the first setting unit 203, the operation extracting unit 204, the second setting unit 205, the determining unit 206 and the output unit 207 can be implemented, for example, by the CPU 101 executing a program recorded on a recording medium such as the ROM 102, the RAM 103, and the HD 105 shown in FIG. 1, or by the I/F 109.

Figure 3:
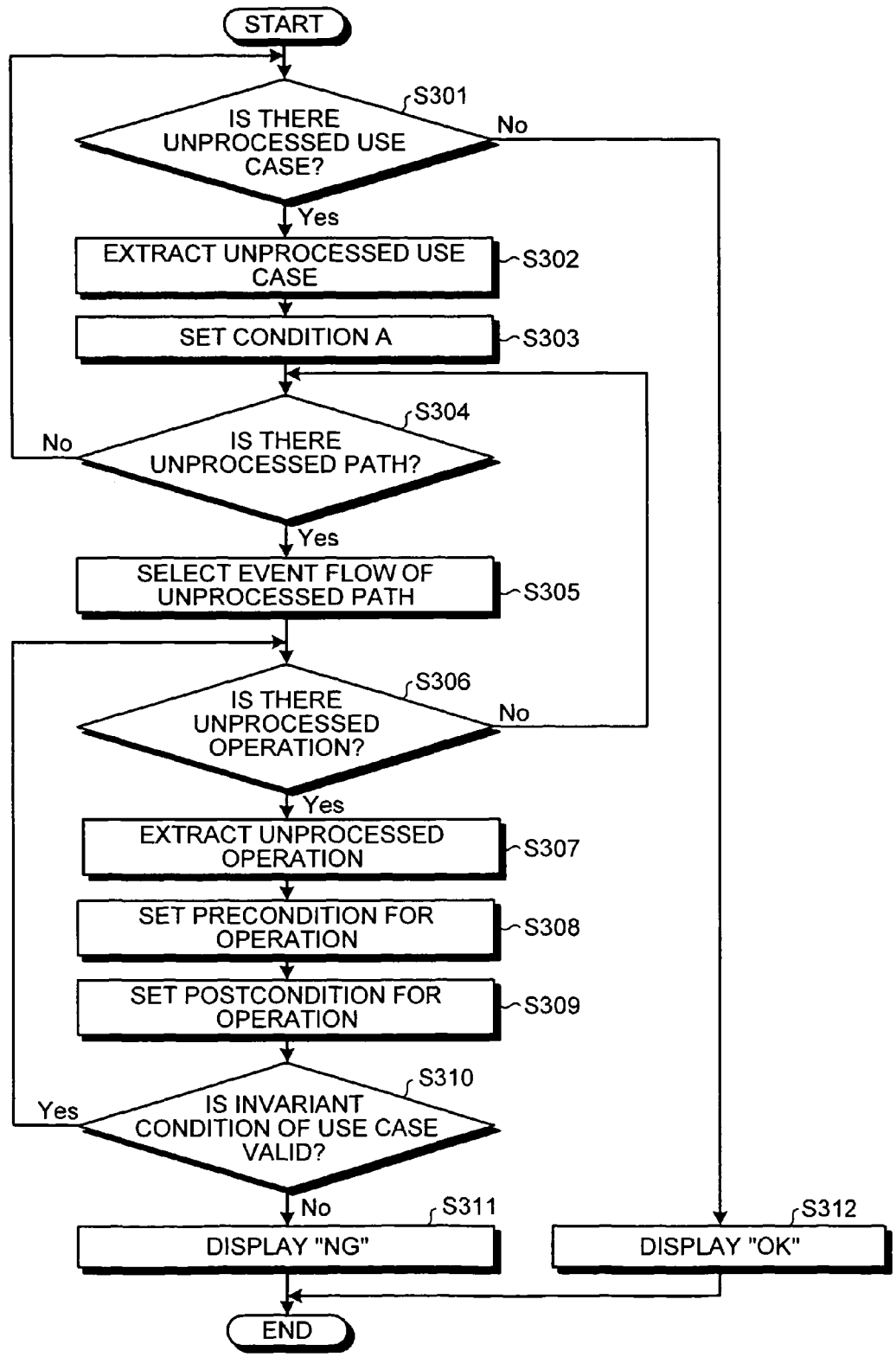
FIG. 3 is a flowchart of a specification verifying process in the apparatus.
Figure 4:
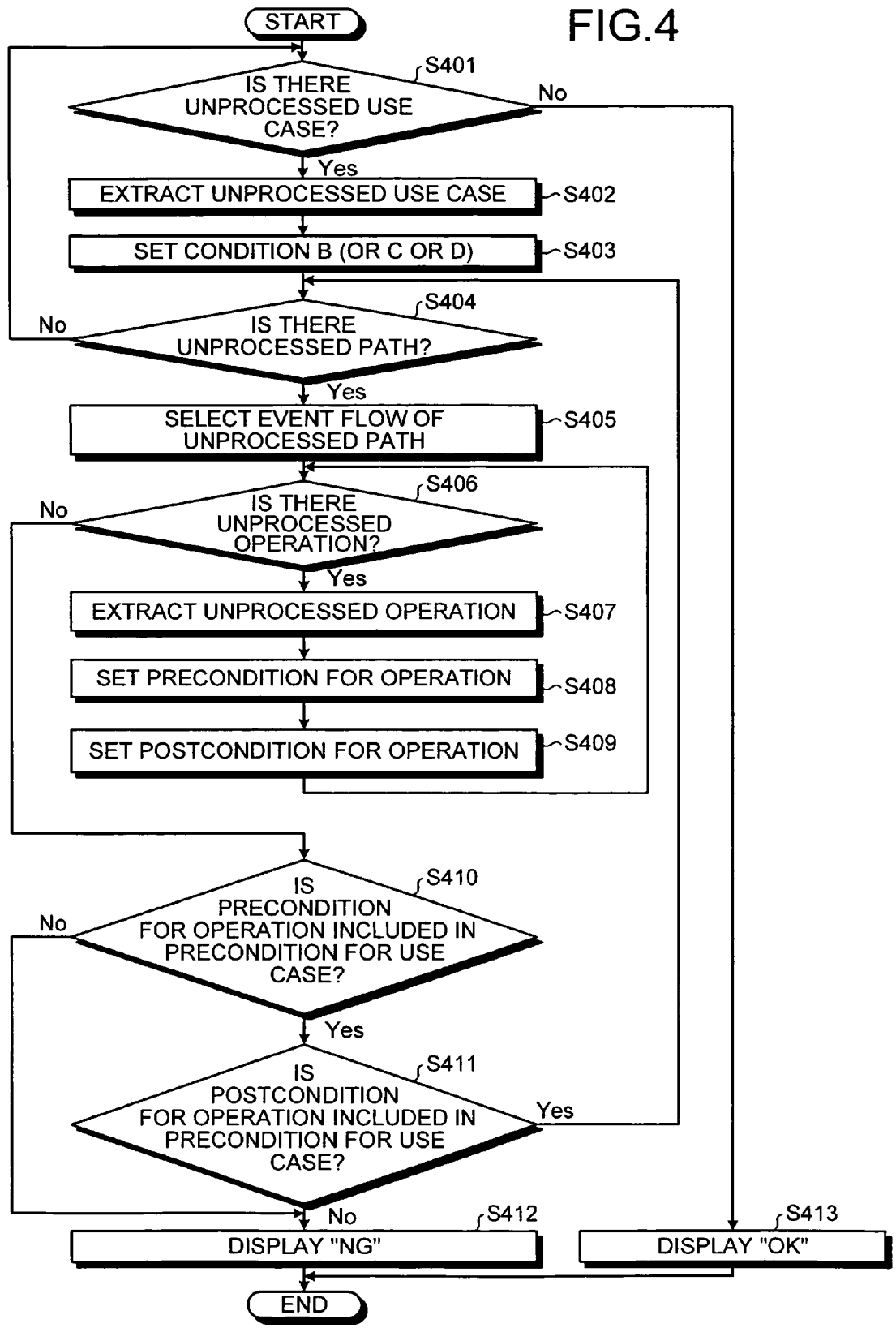
FIG. 4 is a flowchart of a specification verifying process in the apparatus.

FIG. 3 and FIG. 4 are flowcharts of a specification verifying process in the apparatus 200. FIG. 3 is a flowchart of the specification verifying process under condition A, and FIG. 4 is a flowchart of the specification verifying process under conditions B to D.

As shown in FIG. 3, first, it is determined whether there is a use case which has not yet been processed (hereinafter, "unprocessed use case") (step S301). If there is an unprocessed use case ("YES" at step S301), the unprocessed use case is extracted from the specification data 201 (step S302). Condition A is set based on the precondition UPRE, the postcondition UPOS, and the invariant condition UINV for the use case (step S303).

Next, it is determined whether there is a path which has not yet been processed (hereinafter, "unprocessed path") of the use case extracted (step S304). If there is no unprocessed path ("NO" at step S304), the process returns to step S301. If there is an unprocessed path ("YES" at step S304), an event flow of the unprocessed path is selected from the specification data 201 (step S305). It is determined whether there is an operation which has not yet been processed (hereinafter, "unprocessed operation") in the event flow selected (step S306).

If there is no unprocessed operation ("NO" at step S306), the process returns to step S304. If there is an unprocessed operation ("YES" at step S306), the unprocessed operation (description) is extracted from the event flow (step S307). The precondition OiPRE is set (step S308) as well as the postcondition OiPOS (step S309) for the operation extracted.

Then, the precondition UPRE and the postcondition UPOS are replaced with the precondition OiPRE and the postcondition OiPOS to determine whether the invariant condition UINV for the use case is valid (step S310). If the invariant condition UINV is not valid ("NO" at step S310), a result "NG" is displayed (step S311), thus ending the process.

If the invariant condition UINV is valid ("YES" at step S310), the process returns to step S306. If there is no more unprocessed operation ("NO" at step S306), the process returns to step S304. If there is no more unprocessed path ("NO" at step S304), the process returns to step S301. If there is no more unprocessed use case ("NO" at step S301), it is determined that that the determination at step S310 is true of every use case and a result "OK" is output (step S312), thus ending the process.

As shown in FIG. 4, first, it is determined whether there is an unprocessed use case (step S401). If there is an unprocessed use case ("YES" at step S401, the unprocessed use case is extracted from the specification data 201 (step S402). Condition B (or C or D) is set based on the precondition UPRE, the postcondition UPOS, and the invariant condition UINV for the use case (step S403).

It is determined whether there is an unprocessed path in the use case extracted (step S404). If there is no unprocessed path ("NO" at step S404), the process returns to step S401. If there is an unprocessed path ("YES" at step S404), an event flow of the unprocessed path is selected from the specification data 201 (step S405). It is determined if there is an unprocessed operation in the event flow selected (step S406).

If there is no unprocessed operation ("NO" at step S406), the process proceeds to step S410. If there is an unprocessed operation ("YES" at step S406), the unprocessed operation (description) is extracted from the event flow selected (step S407). The precondition OiPRE for the operation is set and retained (step S408) and the postcondition OiPOS for the operation is set and retained (step S409) based on the operation (description) extracted. The process then returns to step S406.

Steps S406 to S409 are performed on each of n pieces of the operation descriptions to set and retain preconditions O1PRE to OnPRE and postconditions O1POS to OnPOS.

Then, it is determined whether the preconditions O1PRE to OnPRE for the operation are included to be a subset in the precondition UPRE for the use case under condition B (or C or D) (step S410).

If it is determined that the preconditions O1PRE to OnPRE are not included in the precondition UPRE ("NO" at step S410), it is determined that the specification includes an error and the result "NG" is displayed (step S412), thus ending the process. If it is determined that the preconditions O1PRE to OnPRE are included in the precondition UPRE ("YES" at step S410), the process proceeds further to determine whether the postconditions O1POS to OnPOS for the operation are included in the postcondition UPOS for the use case under condition B (or C or D) (step S411).

If it is determined that the postconditions O1POS to OnPOS are not included in the postcondition UPOS ("NO" at step S411), it is determined that the specification includes an error, and the result "NG" is displayed (step S412), thus ending the process. If the postconditions O1POS to OnPOS are included in the postcondition UPOS ("YES" at step S411), the process returns to step S404. If there is no more unprocessed path ("NO" at step S404), the process returns to step S401. If there is no more unprocessed use case ("NO" at step S401), it is determined that there is no error in the specification, and the result "OK" is output (step S412), thus ending the process.

According to the present embodiment, such problems as errors, inconsistencies, and ambiguities can be removed from the specification before verification of implementation is performed. Furthermore, omission of events or errors in event flows can be removed. Moreover, using a model (specification data) in a similar form to a form of an actual specification, it is possible to obtain more realistic results by the verification. Furthermore, as the verification is based on a static test, the verification is efficient without requiring a number of processes.

Figure 5:
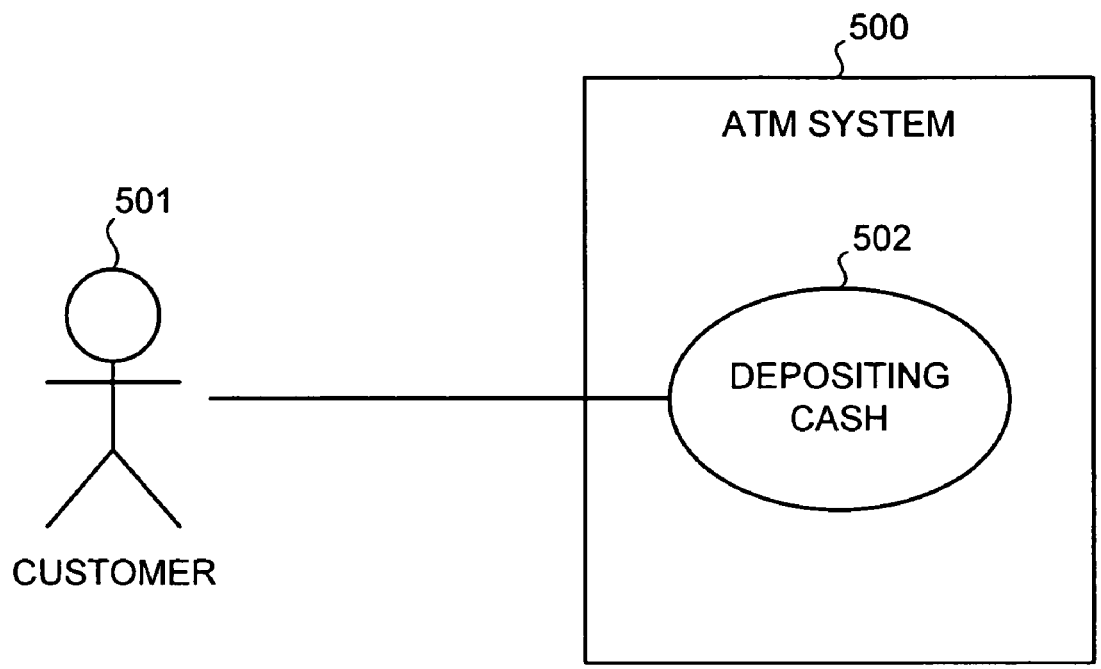
FIG. 5 is a schematic for illustrating a use case of an automatic-teller-machine (ATM) system defined in specification data.

FIG. 5 is a schematic for illustrating a use case of an automatic-teller-machine (ATM) system defined in the specification data 201. A reference numeral 500 in FIG. 5 denotes an ATM system. A reference numeral 501 denotes an actor, which is a customer using the ATM system 500. A reference numeral 502 denotes a use case "depositing cash", representing one of functions of the ATM system 500.

Conditions (precondition, postcondition, and invariant condition) defined for making the use case 502 function are listed in table 1 below.

TABLE 1

| Use case name | Depositing cash |
| --- | --- |
| Function overview | Enabling customer to deposit cash using ATM system |
| Precondition | UPRE-1 ATM system is powered on |
| | UPRE-1 ATM system is in stand-by mode |
| | UPRE-3 Allow passbook usage from 10:00 a.m. to 3:00 p.m. on weekdays |
| Postcondition | UPOS-1 Balance = Opening balance + Credit balance |
| | UPOS-2 If passbook is presented, enter balance in passbook |
| | UPOS-3 If passbook is presented, return passbook |
| | UPOS-4 If ATM card is presented, issue deposit slip |
| | UPOS-5 If ATM card is presented, return ATM card |
| | UPOS-5 Return ATM system to stand-by mode |
| Invariant condition | UINV-1 Power is ON |
| | UINV-2 Credit balance is unchanged |

Figure 6:
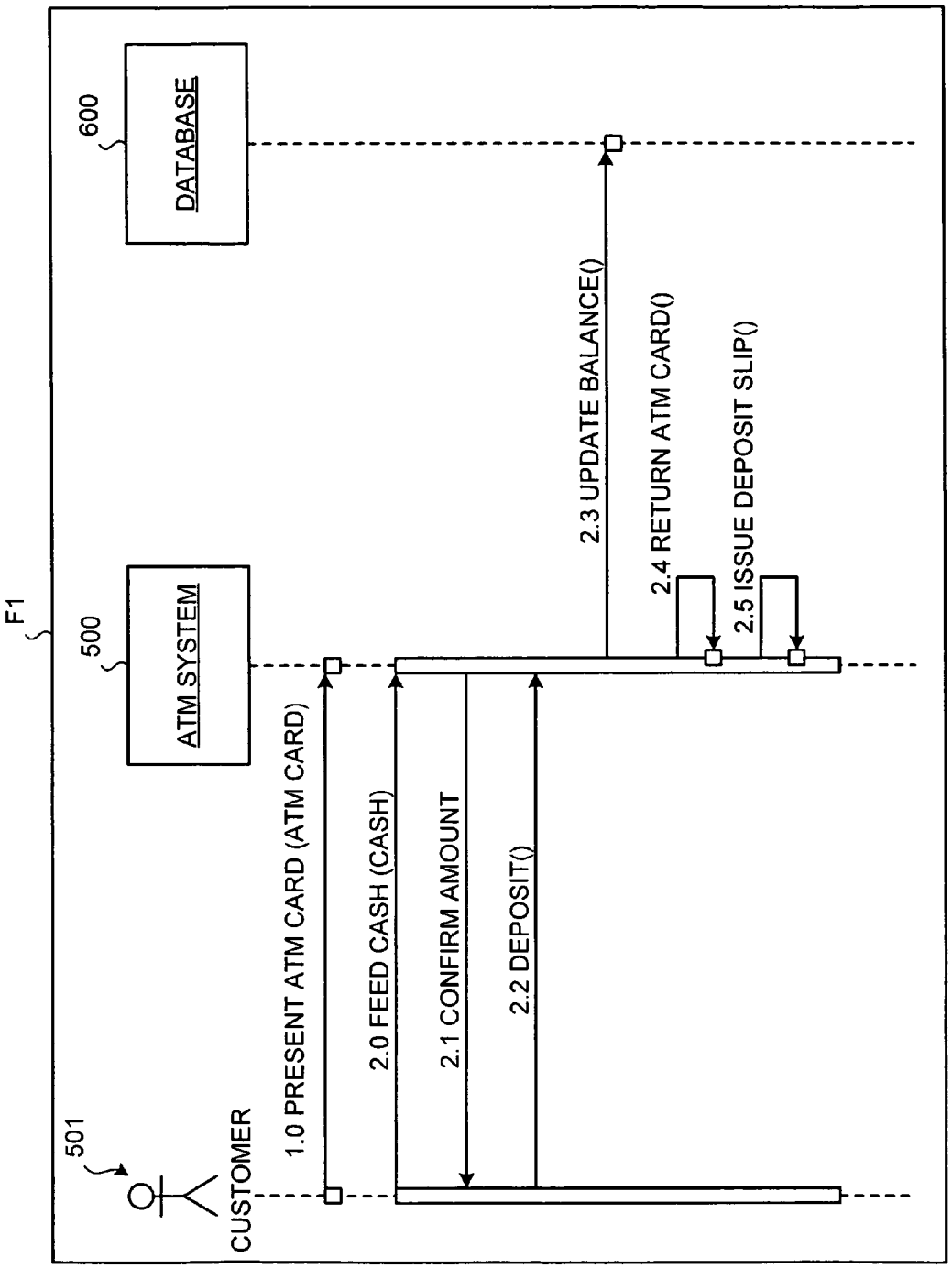
FIG. 6 is a sequence diagram for illustrating an event flow of a basic path.

The basic path is an event flow involving depositing cash using the ATM card. FIG. 6 is a sequence diagram for illustrating the event flow of the basic path. Numbers 1.0 to 2.5 shown in FIG. 6 denote sequence numbers.

In an event flow F1 shown in FIG. 6, first, the customer 501 inserts the ATM card in the ATM system 500 (1.0). Next, the customer 501 feeds the cash in the ATM system 500 (2.0). The ATM system 500 makes confirmation on an amount of the cash to the customer 501 (2.1). Upon confirming the amount, the customer 501 completes the deposit by pressing the "OK" button (2.2).

The ATM system 500 then updates the credit balance of the customer 501 in a database 600 (2.3). Next, the ATM system 500 returns the ATM card to the customer 501 (2.4) and issues a deposit slip (2.5).

Figure 7:
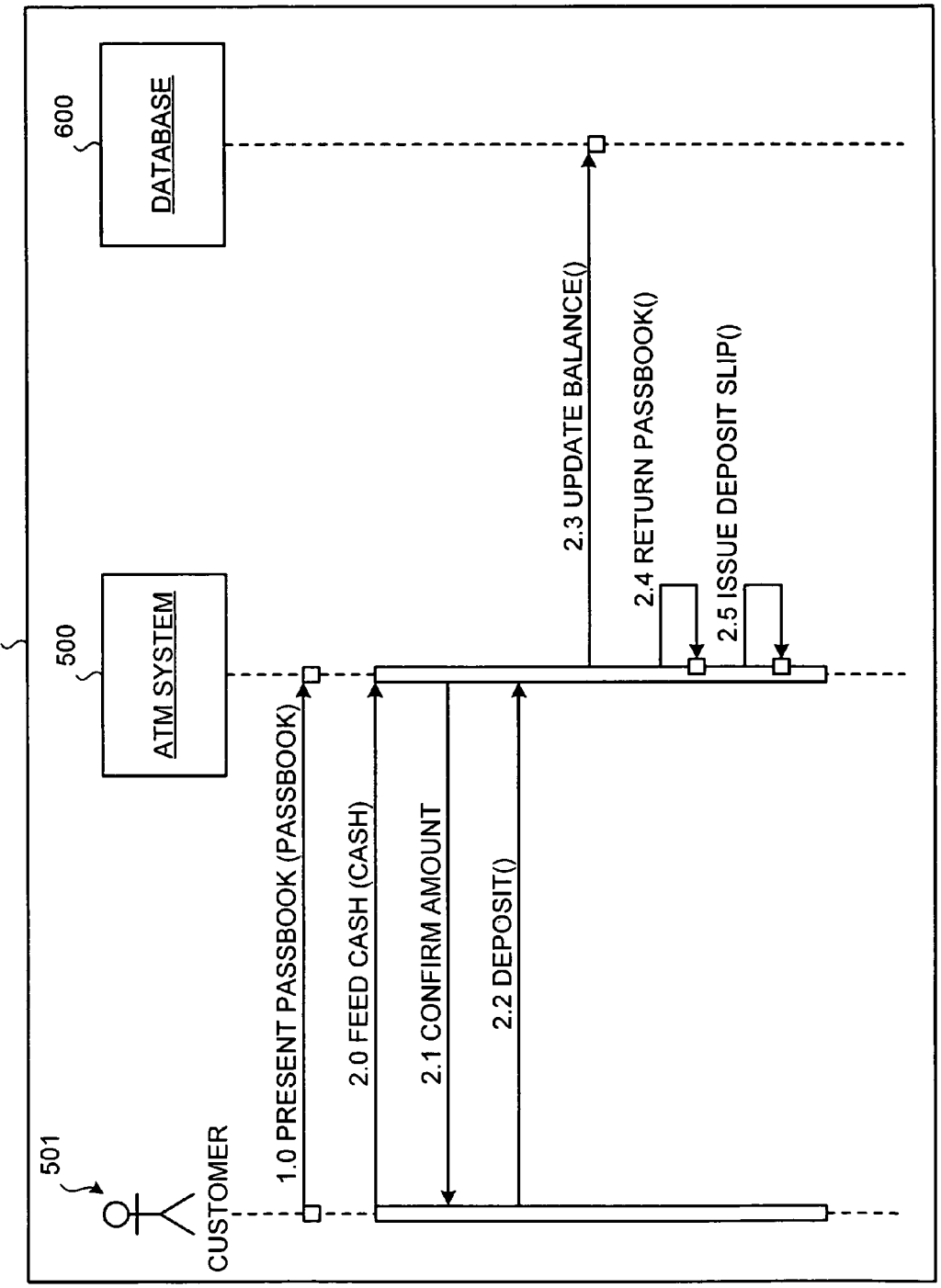
FIG. 7 is a sequence diagram for illustrating the event flow of an alternative path.

The alternative path is an event flow involving depositing cash using the passbook. FIG. 7 is a sequence diagram for illustrating the event flow of the alternative path. Numbers 1.0 to 2.5 shown in FIG. 7 denote sequence numbers.

In an event flow F2 shown in FIG. 7, first, the customer 501 inserts the passbook in the ATM system 500 (1.0). Next, the customer 501 feeds the cash into the ATM system 500 (2.0). The ATM system 500 then makes confirmation on the cash to the customer 502 (2.1). Upon confirming the amount, the customer 501 completes the deposit by pressing the "OK" button (2.2).

The ATM system 500 then updates the credit balance of an account of the customer 501 in the database 600 (2.3). Next, the ATM system 500 returns the passbook to the customer 501 (2.4) and issues a deposit slip (2.5).

Figure 8:
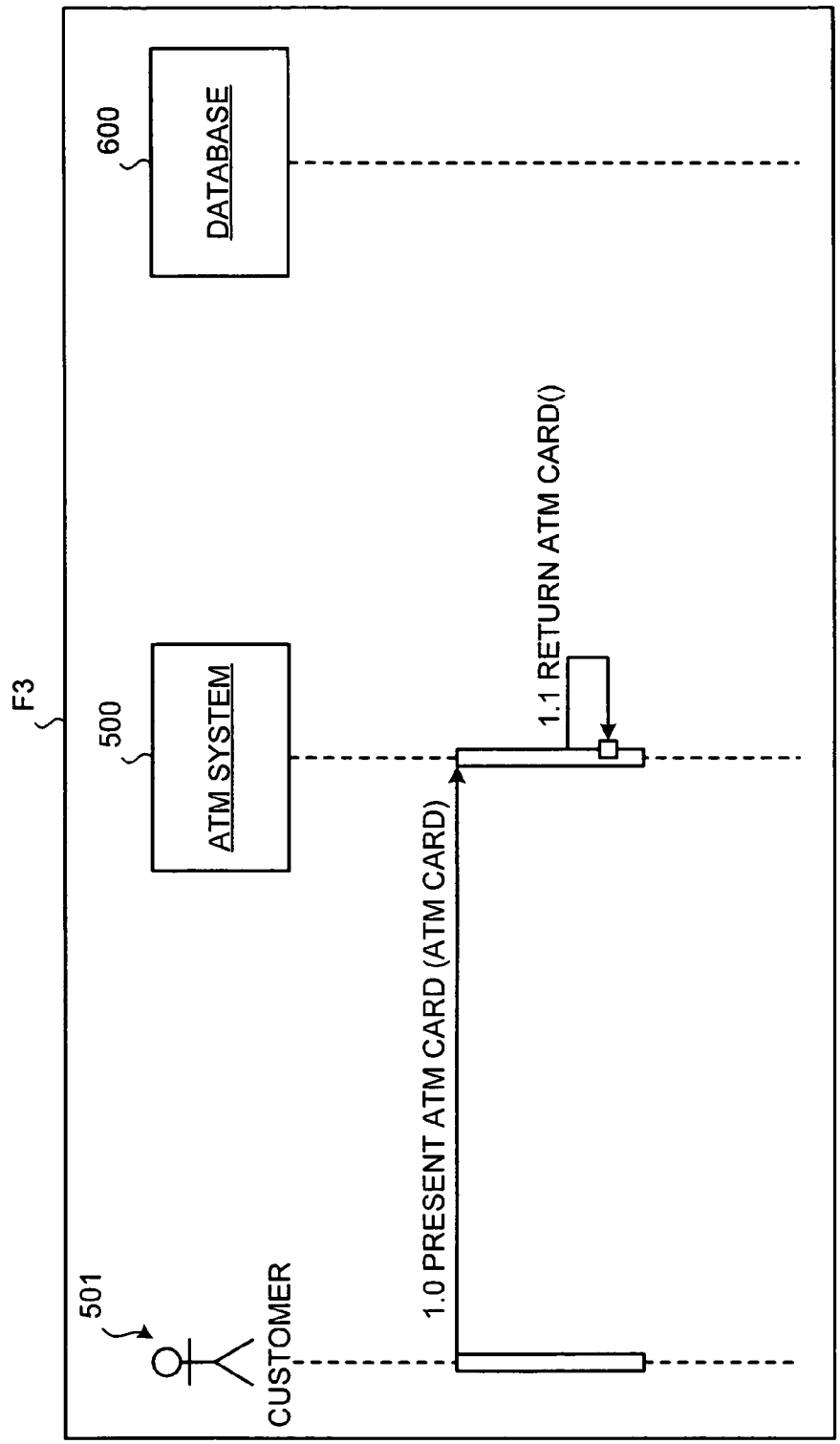
FIG. 8 is a sequence diagram for illustrating the event flow of an exceptional path 1.

An exceptional path 1 is an event flow involving use of an invalid ATM. FIG. 8 is a sequence diagram for illustrating the event flow of the exceptional path 1. Numbers 1.0 and 1.1 shown in FIG. 8 denote sequence numbers.

In an event flow F3 shown in FIG. 8, first, the customer 501 inserts the ATM card in the ATM system 500 (1.0). As the ATM card is invalid, the ATM system 500 returns the ATM card (1.1).

Postconditions UE1POS-1 and UE1POS-2 for the exceptional path 1 are as follows.

Figure 9:
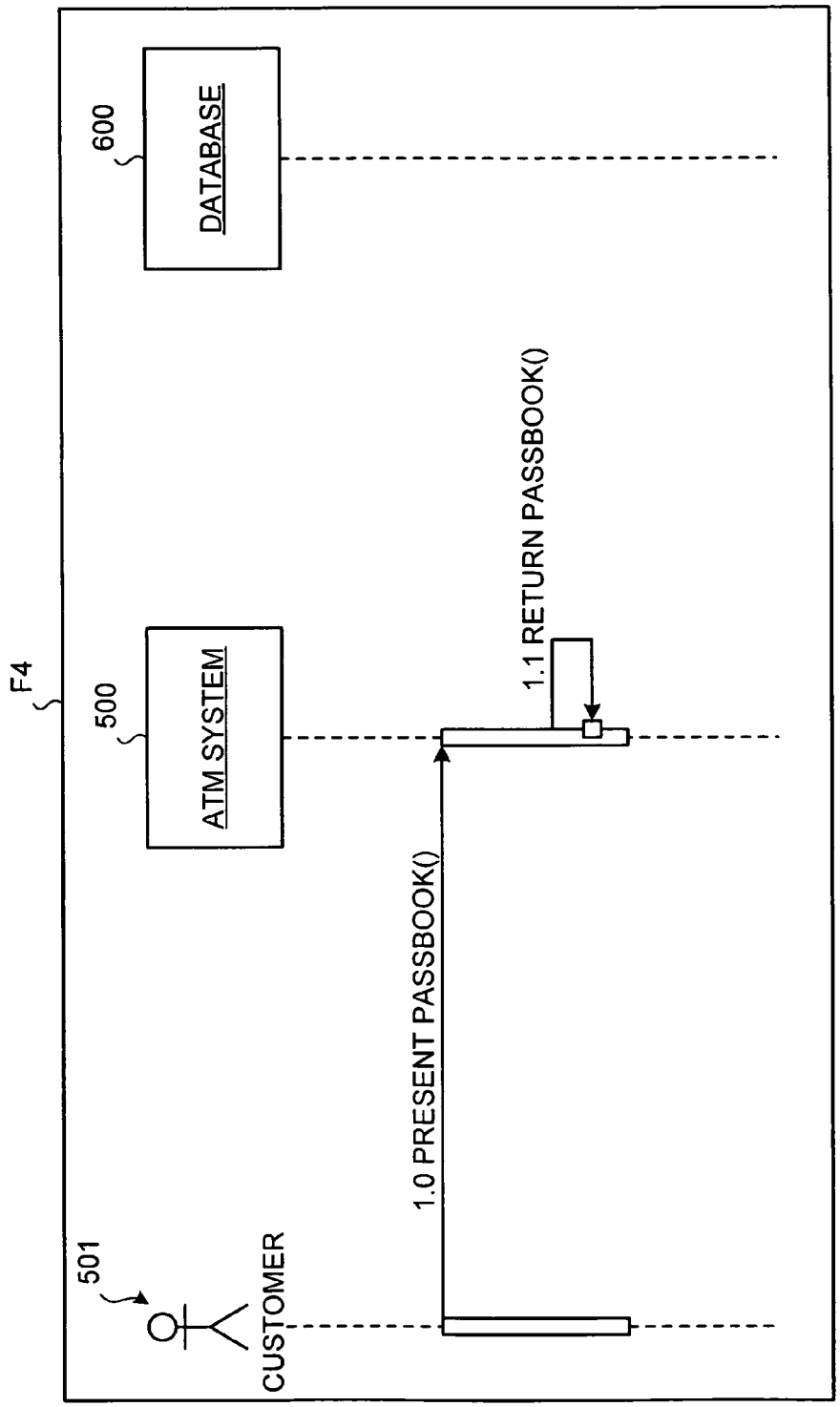
FIG. 9 is a sequence diagram for illustrating the event flow of an exceptional path 2.

UE1POS-1: ATM card is returned
UE1POS-2: ATM system 500 is returned to stand-by mode An exceptional path 2 is an event flow involving use of an invalid passbook. FIG. 9 is a sequence diagram for illustrating the event flow of the exceptional path 2. Numbers 1.0 and 1.1 shown in FIG. 9 denote sequence numbers.

In an event flow F4 shown in FIG. 9, the customer 501 inserts the passbook in the ATM system 500 (1.0). As the passbook is invalid, the ATM system 500 returns the passbook (1.1).

Postconditions UE2POS-1 and UE2POS-2 for the exceptional path 2 are as follows.

Figure 10:
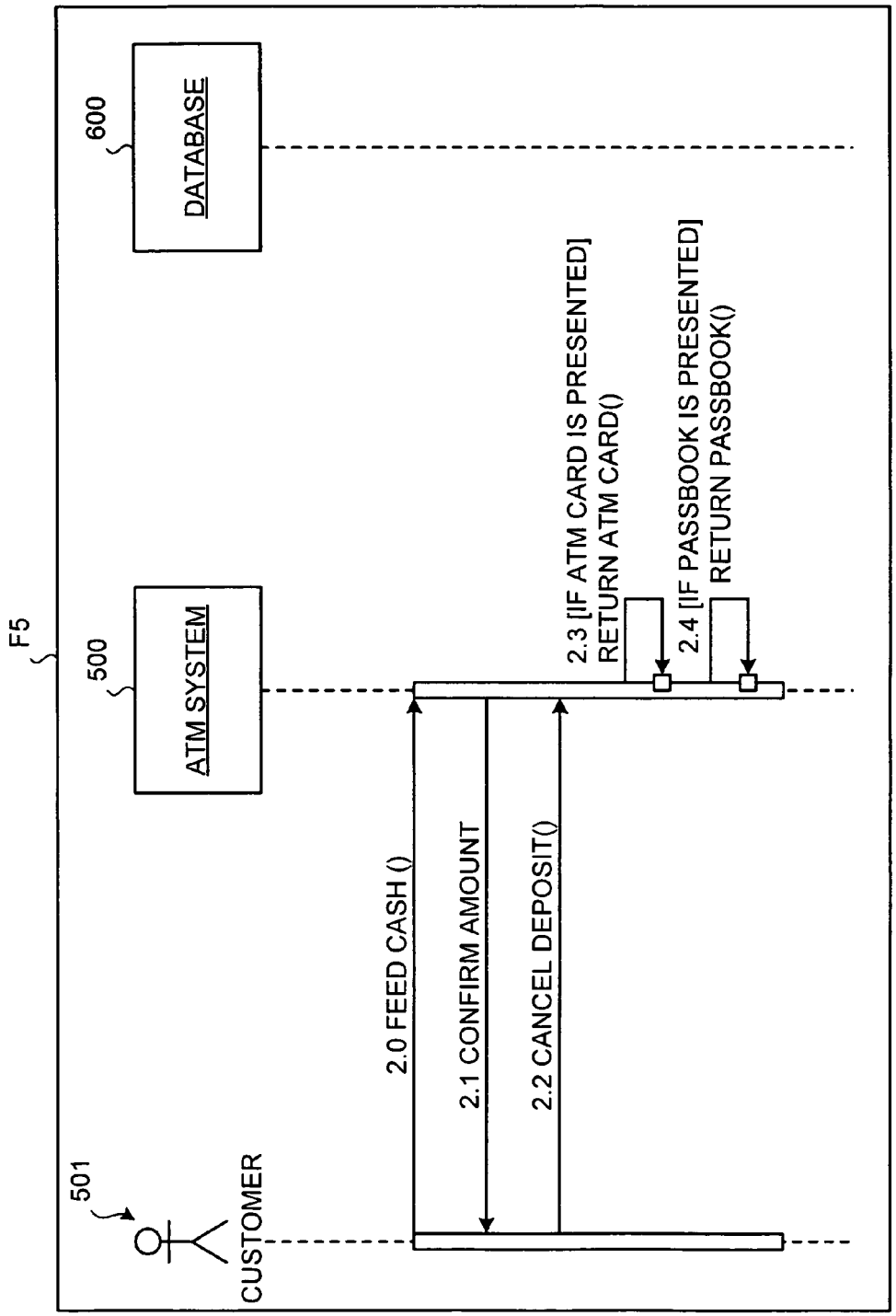
FIG. 10 is a sequence diagram for illustrating the event flow of an exceptional path 3.

UE2POS-1: Passbook is returned
UE2POS-2: ATM system 500 is returned to stand-by mode An exceptional path 3 is an event flow involving aborting depositing. FIG. 10 is a sequence diagram for illustrating the event flow of the exceptional path 3. Numbers 2.0 to 2.4 in FIG. 10 denote sequence numbers.

In an event flow F5 shown in FIG. 10, first, the customer 501 feeds the cash into the ATM system 500 (2.0). The ATM system then makes confirmation on an amount of the cash to the customer 501 (2.1). Upon confirming the amount, the customer 501 presses the "cancel" button to cancel the deposit (2.2).

The ATM system 500 then returns to the customer 501 either the ATM card (2.3) or the passbook (2.4).

Postconditions UE3POS-1 to UE3POS-4 for the exceptional path 3 are as follows.

UE3POS-1: Cash is returned
UE3POS-2: If ATM card is presented, ATM card is returned
UE3POS-3: If passbook is presented, passbook is returned
UE3POS-4: ATM system 500 is returned to stand-by mode Operations shown in Tables 2 to 9 are defined in the specification data 201.

Table 2 lists the operation description of ATM card insertion.

TABLE 2

| Operation name | ATM card insertion (ATM card) |
|---|---|
| Overview | Confirm validity of ATM card by inserting ATM card |
| Precondition | O1PRE-1 ATM system is powered on<br>O1PRE-2 ATM system is in stand-by mode |
| Postcondition | O1POS-1 If ATM card is valid, change mode of ATM system to deposit-waiting mode<br>O1POS-2 If ATM card is not valid, return ATM card and return ATM system to stand-by mode |

Table 3 lists the operation description of feeding cash.

TABLE 3

| Operation name | Feed cash (cash) |
|---|---|
| Overview | Operation for depositing cash |
| Precondition | O2PRE-1 ATM system is in stand-by mode |
| Postcondition | O2POS-1 If it is operated for "Deposit( )",<br>O2POS-1-1 Credit balance = Opening balance + Credit balance<br>O2POS-1-2 If passbook is presented, enter balance in passbook<br>O2POS-1-3 If passbook is presented, return passbook<br>O2POS-1-4 If ATM card is presented, issue deposit slip<br>O2POS-1-5 If ATM card is presented, return ATM card<br>O2POS-1-6 Return ATM system to stand-by mode<br>O2POS-2 If it is operated for "Cancel Deposit( )",<br>O2POS-2-1 If passbook is presented, return passbook<br>O2POS-2-2 If ATM card is presented, return ATM card<br>O2POS-2-3 Return cash<br>O2POS-2-4 Return ATM system to stand-by mode |

Table 4 lists the operation description of cash deposition.

TABLE 4

| Operation name | Deposit( ) |
|---|---|
| Overview | Assist deposition of cash |
| Precondition | O3PRE-1 "Confirm amount" is issued |
| Postcondition | O3POS-1 ATM system is in deposit-waiting mode |

Table 5 lists the operation description of balance updating.

TABLE 5

| Operation name | Update balance( ) |
|---|---|
| Overview | Update balance |
| Precondition | O4PRE-1 ATM system is in deposit-waiting mode |
| Postcondition | O4POS-1 Credit balance = Opening balance + Credit balance<br>O4POS-2 Change mode of ATM system to balance-updated mode |

Table 6 lists the operation description of ATM card return.

TABLE 6

| Operation name | Return card( ) |
|---|---|
| Overview | Return ATM card |
| Precondition | O5PRE-1 ATM system is in balance-updated mode |
| Postcondition | O5POS-1 Return ATM card<br>O5POS-2 Change mode of ATM system to ATM-card-returned mode |

Table 7 lists the operation description of deposit slip issue.

TABLE 7

| Operation name | Issue deposit slip( ) |
|---|---|
| Overview | Issue deposit slip |
| Precondition | O6PRE-1 ATM system is in ATM-card-returned mode |
| Postcondition | O6POS-1 Issue deposit slip<br>O6POS-2 Return ATM system to stand-by mode |

Table 8 lists the operation description of passbook entry.

TABLE 8

| Operation name | Make passbook entry( ) |
|---|---|
| Overview | Make entry of balance in passbook |
| Precondition | O7PRE-1 ATM system is in balance-updated mode |
| Postcondition | O7POS-1 Make entry of balance in passbook |
| | O7POS-2 Change mode of ATM system to passbook-entry-completed mode |

Table 9 lists the operation description of passbook return.

TABLE 9

| Operation name | Return passbook( ) |
|---|---|
| Overview | Return passbook |
| Precondition | O8PRE-1 ATM system is in passbook-entry-completed mode |
| Postcondition | O8POS-1 Return passbook |
| | O8POS-2 Return ATM system to stand-by mode |

The verification of correctness of the specification is conducted as follows. First, verification of Condition A "Precondition->Invariant condition until postcondition" is carried out. This verification is carried out according to the steps in the flowchart shown in FIG. 3. The conditions listed in Table 1 defined for the use case 502 to execute are applied in an expression.

Upon applying the preconditions UPRE-1 to UPRE-3 in the expression, the precondition UPRE shown in Eq. 1 below is set.

$$UPRE = UPRE\text{-}1 \wedge UPRE\text{-}2 \wedge UPRE\text{-}3 \tag{1}$$

The precondition UPRE in Eq. 1 is obtained by combining the preconditions UPRE-1 to UPRE-3 listed in Table 1 with "AND". Thus, all the preconditions UPRE-1 to UPRE-3 are satisfied in the ATM system 500.

Upon applying the postconditions UPOS-1 to UPOS-6 in the expression, the postcondition UPOS in Eq. 2 below is set.

$$UPOS = UPOS\text{-}1 \wedge UPOS\text{-}2 \wedge UPOS\text{-}3 \wedge UPOS\text{-}4 \wedge UPOS\text{-}5 \wedge UPOS\text{-}6 \tag{2}$$

The postcondition UPOS in Eq. 2 is obtained by combining the postconditions UPOS-1 to UPOS-6 listed in Table 1 with "AND". Thus, all the postconditions UPOS-1 to UPOS-6 are satisfied in the ATM system 500.

Upon applying the invariant conditions UINV-1 and UINV-2 in the expression, the invariant condition UINV shown in Eq. 3 below is set.

$$UINV = UINV\text{-}1 \wedge UINV\text{-}2 \tag{3}$$

The invariant condition UPOS of Eq. 3 is obtained by combining the invariant conditions UINV-1 and UINV-2 listed in Table 1 with "AND". Thus, both the invariant conditions UINV-1 and UINV-2 are satisfied in the ATM system 500.

Next, it is verified whether the precondition UPRE in Eq. 1, the postcondition UPOS in Eq. 2, and the invariant condition UINV in Eq. 3 satisfy Condition A shown in Eq. 4 below for the basic path shown in FIG. 6 as well as for the alternative path shown in FIG. 7.

$$UPRE\text{->}UINV \text{ until } UPOS \tag{4}$$

Next, it is determined whether Eq. 4 is correct. Specifically, the basic path and the alternative path are selected individually to determine if Eq. 4 is correct in each instance. First the event flow F1 of the basic path shown in FIG. 6 is selected. In the event flow F1, the operation description (operation descriptions shown in Tables 2 to 7) of all the operations 1.0 to 2.5 are extracted. However, the precondition O1PR and the postcondition O1POS of operation 1.0 of the event flow F1 are set according to Eqs. 5 and 6 blow.

$$O1PRE = O1PRE\text{-}1 \wedge O1PRE\text{-}2 \tag{5}$$

$$O1POS = O1POS\text{-}1 \wedge O1POS\text{-}2 \tag{6}$$

Since both the power status and the balance remain the same prior to and after operation 1.0 of the event flow F1, invariant condition UINV is valid for operation 1.0 of the event flow F1 (see Eq. 7 below).

$$UINV = TRUE \tag{7}$$

However, the precondition O4PRE and the postcondition O4POS of operation 2.3 of the event flow F1 are set according to Eqs. 8 and 9 blow.

$$O4PRE = O4PRE\text{-}1 \tag{8}$$

$$O4POS = O4POS\text{-}1 \wedge O4POS\text{-}2 \tag{9}$$

Since the balance has changed after operation 2.3 of the event flow F1 (see Table 5), invariant condition UINV is invalid for the postcondition O4POS-1 for the operation (see Eq. 10 below).

$$UINV = FALSE \tag{10}$$

The determination of error in the equation is taken to indicate a fault in the specification, and a result "NG" is output. When all the event flows and operations are determined to be valid, the specification is determined to be correct.

In the example above, the balance updating in operation 2.3 is carried out during the event flow F1. Consequently, the postcondition UPOS for the use case is not satisfied and is determined to be invalid. To correct the error, the invariant condition should be eliminated or a change should be made in the event flow F1 of the basic path.

Figure 11:
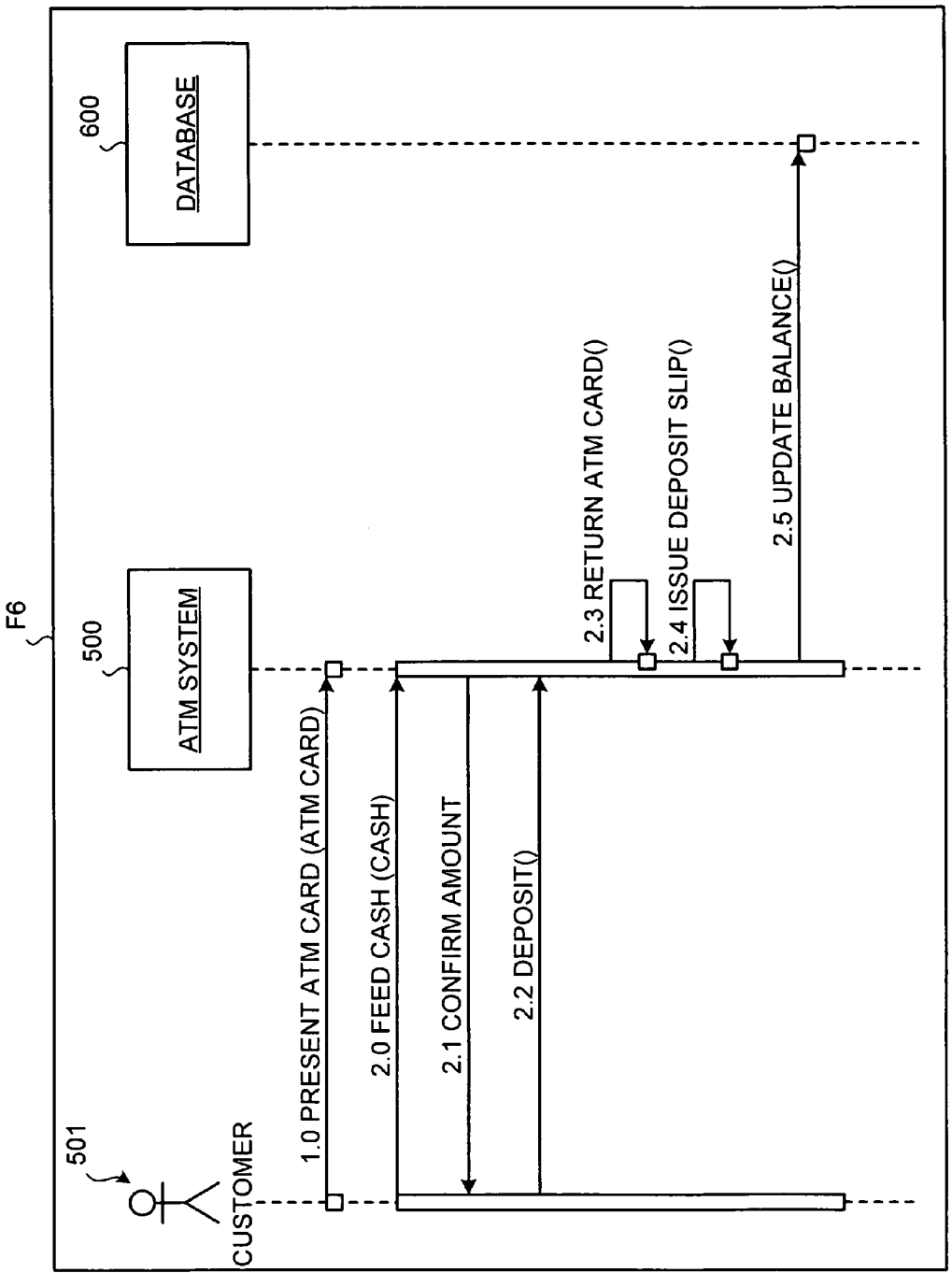
FIG. 11 is a sequence diagram for illustrating a modified event flow.

FIG. 11 is a sequence diagram illustrating a modified event flow 6. As shown in FIG. 11, operation 2.3 is changed to "return ATM card( )", operation 2.4 is changed to "issue deposit slip( )", and operation 2.5 is changed to "update balance( )".

Next verification of the specification is carried out. Specification is verified according to the steps in the flowchart shown in FIG. 4. However, the precondition O1PRE and the postcondition O1POS of operation 1.0 of the event flow F1 are set according to Eqs. 5 and 6, respectively.

The precondition O1PRE is retained. Specifically, the precondition O1PRE is retained as shown in Eq. 11 below. Similarly, the postcondition O1POS is retained as shown in Eq. 12 below.

$$TPRE = TPRE \wedge O1PRE \tag{11}$$

$$TPOS = TPOS \wedge O1POS \tag{12}$$

This process is repeated for operation 1.0 to operation 2.5 of the event flow F1, and the precondition O1PRE and the postcondition O1POS are retained.

The preconditions TPRE retained for operations 1.0 to 2.5 of the event flow F1 would then satisfy the precondition UPRE for the use case (see Eq. 13 below).

$$TPRE \subset UPRE == TRUE? \tag{13}$$

The verification method can be similarly used for the postcondition UPOS for the use case. In the example presented, verification is carried out for the basic path. Alternative paths, and exceptional paths can also be similarly verified, thus enabling verification of the specification. Exceptional postconditions become applicable as postconditions during verification of exceptional paths.

Thus, according to the method and apparatus for verifying a specification, and the computer product, the specification can be clearly stated by defining in terms of use cases, event flows, paths, preconditions, postconditions, and invariant conditions. Furthermore, inconsistencies, errors, or omissions can be detected by verifying the preconditions, postconditions, and invariant conditions for the use cases. Moreover, correctness of the specification can be guaranteed prior to actual implementation. Consequently, it is possible to reduce number of processes in the verification work.

The method of verifying a specification according to the present embodiment can be implemented by executing a computer program prepared in advance by a computer, such as a personal computer and a workstation. The computer program is recorded in a computer-readable recording medium, such as the CD-ROM, the MO, and the DVD, and is executed by the computer reading out from the recording medium. The computer program may be a transmission medium that is distributed through a network such as the Internet.

According to the present invention, it is possible to enhance design quality.

Moreover, according to the present invention, it is possible to reduce a design period and a workload involved in design.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A method of verifying a specification document, comprising:
    reading by a computer the specification document that includes a use case diagram illustrating a function of a target subject of a system design, and an event flow of a path representing an action of the target subject of the system design;
    extracting a use case, and a precondition, a postcondition and an invariant condition defined for the use case, from the use case diagram of the specification document;
    setting a first condition that once the precondition is satisfied, the use case is executed under the invariant condition until the postcondition is satisfied;
    extracting an operation from the event flow;
    setting, as a second precondition defined for the use case, a condition that satisfies the precondition defined for the use case;
    setting, as a second postcondition defined for the use case, a condition that satisfies the postcondition defined for the use case;
    verifying the target subject of the system design by determining whether the invariant condition is valid when the precondition and the postcondition defined for the use case in the first condition are replaced with the second precondition and the second postcondition defined for the use case; and
    outputting a result of the determining.

2. A non-transitory computer-readable storage medium storing a program which when executed on a computer makes the computer to execute:
    reading a specification document that includes a use case diagram illustrating a function of a target subject of a system design, and an event flow of a path representing an action of the target subject of the system design;
    extracting a use case, and a precondition, a postcondition and an invariant condition defined for the use case, from the use case diagram of the specification document;
    setting a first condition that once the precondition is satisfied, the use case is executed under the invariant condition until the postcondition is satisfied;
    extracting an operation from the event flow;
    setting, as a second precondition defined for the use case, a condition that satisfies the precondition defined for the use case;
    setting, as a second postcondition defined for the use case, a condition that satisfies the postcondition defined for the use case;
    verifying the target subject of the system design by determining whether the invariant condition is valid when the precondition and the postcondition defined for the use case in the first condition are replaced with the second precondition and the second postcondition defined for the use case; and
    outputting a result of the determining.

3. An apparatus, comprising:
    an input unit reading a specification document that includes a use case diagram illustrating a function of a target subject of a system design, and an event flow of a path representing an action of the target subject of the system design;
    a first extracting unit extracting a use case, and a precondition, a postcondition and an invariant condition defined for the use case, from the use case diagram of the specification document;
    a first setting unit setting a first condition that once the precondition is satisfied, the use case is executed under the invariant condition until the postcondition is satisfied;
    a second extracting unit extracting an operation from the event flow;
    a second setting unit setting, as a second precondition defined for the use case, a condition that satisfies the precondition defined for the use case, and setting, as a second postcondition defined for the use case, a condition that satisfies the postcondition defined for the use case;
    a determining unit determining whether the invariant condition is valid when the precondition and the postcondition defined for the use case in the first condition are replaced with the second precondition and the second postcondition defined for the use case; and
    an outputting unit outputting a result of the determining unit.

4. A method of verifying a specification document, comprising:
    reading by a computer the specification document that includes a use case diagram illustrating a function of a target subject of a system design, and an event flow of a path representing an action of the target subject of the system design;
    extracting a use case, an event flow of a path representing an action of the target subject of the system design, a precondition defined in the use case before the path representing the action of the target subject of the system design is executed, and a postcondition defined in the use case after the path representing the action of the target subject of the system design is executed;
    setting a first condition that when the precondition is satisfied, if the path representing the action of the target subject of the system design is executed, the postcondition is satisfied;

extracting an operation from the event flow of the path representing the action of the target subject of the system design;

setting, as a second precondition defined in the use case, a condition that satisfies the precondition defined in the use case;

setting, as a second postcondition defined in the use case, a condition that satisfies the postcondition defined in the use case;

verifying the target subject of the system design by determining whether the second precondition defined in the use case is included in the precondition defined in the use case within the first condition and whether the second postcondition defined in the use case is included in the postcondition defined in the use case within the first condition; and outputting a result of the determining.

5. A method of verifying a specification document, comprising:

reading by a computer the specification document that includes a use case diagram illustrating a function of a target subject of a system design, and an event flow of a path representing an action of the target subject of the system design;

extracting a use case, and a precondition, a postcondition and an invariant condition defined for the use case, from the use case diagram of the specification document;

setting a first condition that once the precondition is satisfied, the use case is executed under the invariant condition until the postcondition is satisfied;

extracting an event flow of a path representing an action of the target subject of the system design, a precondition defined in the use case before the path representing the action of the target subject of the system design is executed, and a postcondition defined in the use case after the path representing the action of the target subject of the system design is executed;

setting a second condition that when the precondition is satisfied, if the path representing the action of the target subject of the system design is executed, the postcondition is satisfied;

extracting an operation from the event flow;

setting, as a second precondition defined for the use case, a condition that satisfies the precondition defined for the use case;

setting, as a second postcondition defined for the use case, a condition that satisfies the postcondition defined for the use case;

verifying the target subject of the system design by determining whether the invariant condition is valid when the precondition and the postcondition defined for the use case in the first condition are replaced with the second precondition and the second postcondition defined for the use case, and determining whether the second precondition defined for the use case is included in the precondition defined in the use case within the second condition and whether the second postcondition defined for the use case is included in the postcondition defined in the use case within the second condition; and outputting a result of the determining.

6. A non-transitory computer-readable storage medium storing a program which when executed on a computer makes the computer to execute:

reading by a computer the specification document that includes a use case diagram illustrating a function of a target subject of a system design, and an event flow of a path representing an action of the target subject of the system design;

extracting a use case, an event flow of a path representing an action of the target subject of the system design, a precondition defined in the use case before the path representing the action of the target subject of the system design is executed, and a postcondition defined in the use case after the path representing the action of the target subject of the system design is executed;

setting a first condition that when the precondition is satisfied, if the path representing the action of the target subject of the system design is executed, the postcondition is satisfied;

extracting an operation from the event flow of the path representing the action of the target subject of the system design;

setting, as a second precondition defined in the use case, a condition that satisfies the precondition defined in the use case;

setting, as a second postcondition defined in the use case, a condition that satisfies the postcondition defined in the use case;

verifying the target subject of the system design by determining whether the second precondition defined in the use case is included in the precondition defined in the use case within the first condition and whether the second postcondition defined in the use case is included in the postcondition defined in the use case within the first condition; and outputting a result of the determining.

7. A non-transitory computer-readable storage medium storing a program which when executed on a computer makes the computer to execute:

reading by a computer the specification document that includes a use case diagram illustrating a function of a target subject of a system design, and an event flow of a path representing an action of the target subject of the system design;

extracting a use case, and a precondition, a postcondition and an invariant condition defined for the use case, from the use case diagram of the specification document;

setting a first condition that once the precondition is satisfied, the use case is executed under the invariant condition until the postcondition is satisfied;

extracting an event flow of a path representing an action of the target subject of the system design, a precondition defined in the use case before the path representing the action of the target subject of the system design is executed, and a postcondition defined in the use case after the path representing the action of the target subject of the system design is executed;

setting a second condition that when the precondition is satisfied, if the path representing the action of the target subject of the system design is executed, the postcondition is satisfied;

extracting an operation from the event flow;

setting, as a second precondition defined for the use case, a condition that satisfies the precondition defined for the use case;

setting, as a second postcondition defined for the use case, a condition that satisfies the postcondition defined for the use case;

verifying the target subject of the system design by determining whether the invariant condition is valid when the precondition and the postcondition defined for the use case in the first condition are replaced with the second precondition and the second postcondition defined for the use case, and determining whether the second precondition defined for the use case is included in the precondition defined in the use case within the second condition and whether the second postcondition defined for the use case is included in the postcondition defined in the use case within the second condition; and outputting a result of the determining.

8. An apparatus, comprising:

an input unit reading the specification document that includes a use case diagram illustrating a function of a target subject of a system design, and an event flow of a path representing an action of the target subject of the system design;

a first extracting unit extracting a use case, an event flow of a path representing an action of the target subject of the system design, a precondition defined in the use case before the path representing the action of the target subject of the system design is executed, and a postcondition defined in the use case after the path representing the action of the target subject of the system design is executed;

a first setting unit setting a first condition that when the precondition is satisfied, if the path representing the action of the target subject of the system design is executed, the postcondition is satisfied;

a second extracting unit extracting an operation from the event flow of the path representing the action of the target subject of the system design;

a second setting unit setting, as a second precondition defined in the use case, a condition that satisfies the precondition defined in the use case and setting, as a second postcondition defined in the use case, a condition that satisfies the postcondition defined in the use case;

a determining unit determining whether the second precondition defined in the use case is included in the precondition defined in the use case within the first condition and whether the second postcondition defined in the use case is included in the postcondition defined in the use case within the first condition; and an outputting unit outputting a result of the determining unit.

9. An apparatus, comprising:

an input unit reading by a computer the specification document that includes a use case diagram illustrating a function of a target subject of a system design, and an event flow of a path representing an action of the target subject of the system design;

a first extracting unit extracting a use case, and a precondition, a postcondition and an invariant condition defined for the use case, from the use case diagram of the specification document;

a first setting unit setting a first condition that once the precondition is satisfied, the use case is executed under the invariant condition until the postcondition is satisfied;

a second extracting unit extracting an event flow of a path representing an action of the target subject of the system design, a precondition defined in the use case before the path representing the action of the target subject of the system design is executed, and a postcondition defined in the use case after the path representing the action of the target subject of the system design is executed;

a second setting unit setting a second condition that when the precondition is satisfied, if the path representing the action of the target subject of the system design is executed, the postcondition is satisfied;

a third extracting unit extracting an operation from the event flow;

a third setting unit setting, as a second precondition defined for the use case, a condition that satisfies the precondition defined for the use case, and setting, as a second postcondition defined for the use case, a condition that satisfies the postcondition defined for the use case;

a determining unit determining whether the invariant condition is valid when the precondition and the postcondition defined for the use case in the first condition are replaced with the second precondition and the second postcondition defined for the use case, and determining whether the second precondition defined for the use case is included in the precondition defined in the use case within the second condition and whether the second postcondition defined for the use case is included in the postcondition defined in the use case within the second condition; and an outputting unit outputting a result of the determining.

* * * * *